United States Patent [19]

Ishida

[11] Patent Number: 5,473,480

[45] Date of Patent: Dec. 5, 1995

[54] DISC-LIKE RECORDING MEDIUM AND APPARATUS FOR PRODUCING IT

[75] Inventor: Takehisa Ishida, Tokyo, Japan

[73] Assignee: Sony Corporation, Tokyo, Japan

[21] Appl. No.: 172,718

[22] Filed: Dec. 27, 1993

[30] Foreign Application Priority Data

Dec. 19, 1992 [JP] Japan ................... 4-360470

[51] Int. Cl.[6] ........................................... G11B 5/09
[52] U.S. Cl. ............................. 360/51; 360/48
[58] Field of Search .................. 360/51, 32, 36.1, 360/36.2, 26, 77.08, 73.04, 48; 369/100, 109, 44.26, 44.28, 47, 59

[56] References Cited

U.S. PATENT DOCUMENTS

| | | | |
|---|---|---|---|
| 4,352,131 | 9/1982 | Van Herk et al. | 360/78 |
| 4,633,343 | 12/1986 | Maury et al. | 360/76 |
| 4,669,004 | 5/1987 | Moon et al. | 360/73.03 X |
| 4,783,705 | 11/1988 | Moon et al. | 360/77.08 |
| 5,056,080 | 10/1991 | Russell | 369/100 |
| 5,070,492 | 12/1991 | Ogawa et al. | 369/59 X |
| 5,164,866 | 11/1992 | Sano et al. | 360/77.08 |
| 5,193,035 | 1/1993 | Komota et al. | 360/51 |
| 5,202,865 | 4/1993 | Yanagi | 369/44.28 |
| 5,212,601 | 5/1993 | Wilson | 360/51 |
| 5,278,702 | 1/1994 | Wilson et al. | 360/51 |
| 5,278,815 | 1/1994 | Mashimo et al. | 360/48 |

FOREIGN PATENT DOCUMENTS 0177737 4/1986 European Pat. Off. ........... 360/77.08

*Primary Examiner*—Donald Hajec
*Assistant Examiner*—Thien Minh Le
*Attorney, Agent, or Firm*—Hill, Steadman & Simpson

[57] ABSTRACT

A disc-like recording medium is disclosed in which pre-formatted data such as clock information, servo information or read-only information are formed in advance, and in which the pre-formatted data are formed along locus of rotation of a rotating head actuator for reading information therein. In this recording medium, a radial array of base points such as clock marks and servo marks is formed along the locus of rotation of a recording/reproducing head of the rotating head actuator, the rotating head actuator being provided with the recording/reproducing head via a gimbal spring on the distal end of an arm thereof with a supporting shaft as the center of rotation.

5 Claims, 16 Drawing Sheets

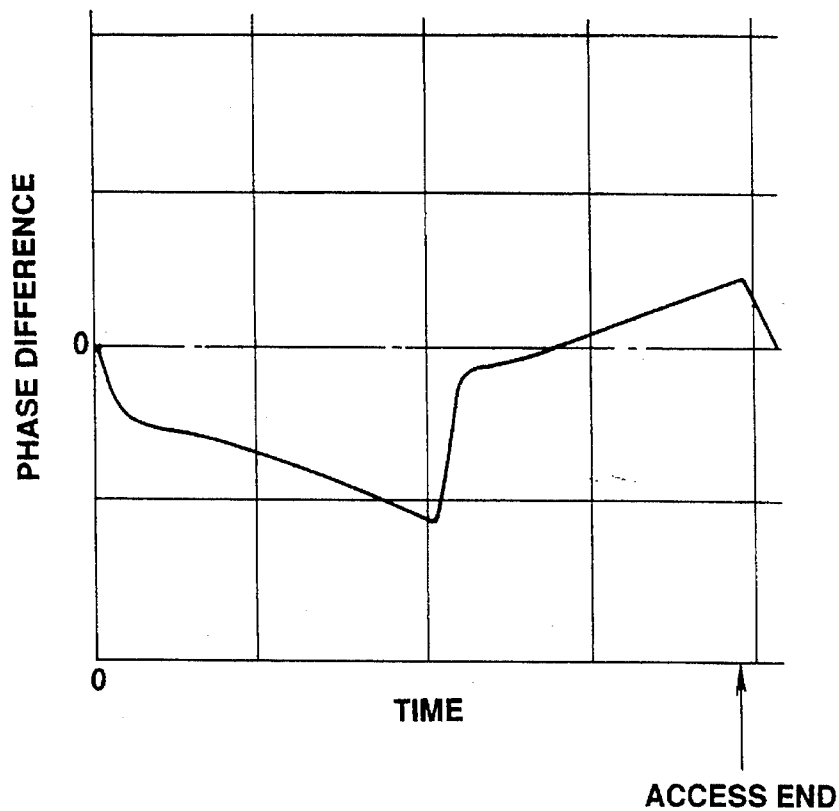
FIG.8
(PRIOR ART)
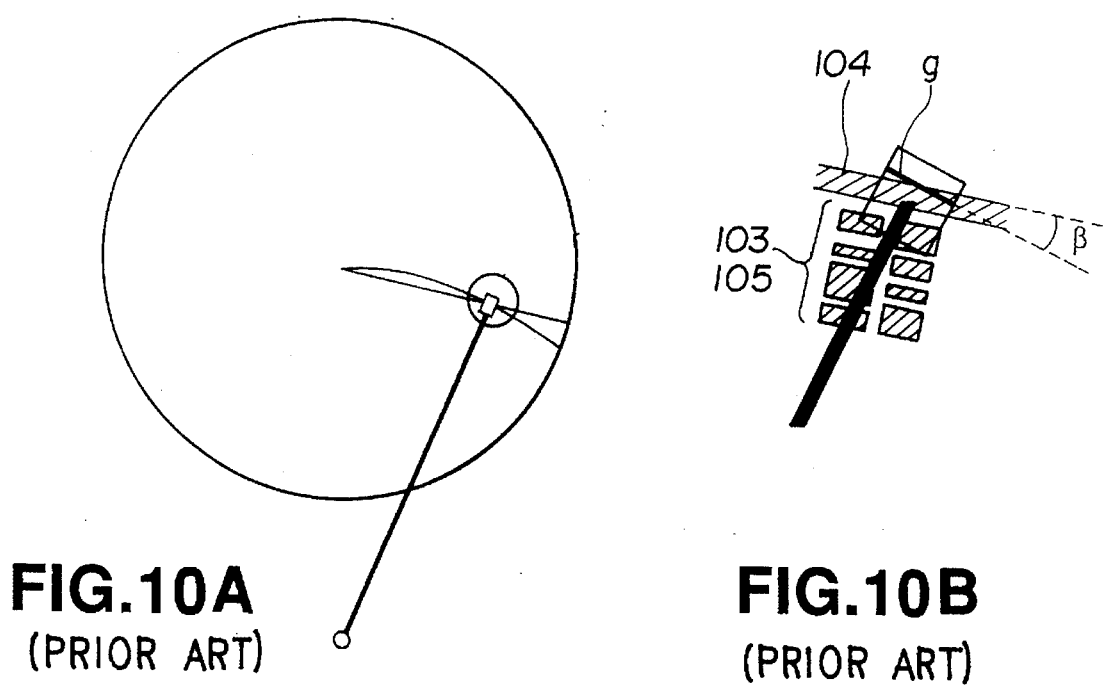
FIG.10A
(PRIOR ART)
FIG.10B
(PRIOR ART)

FIG.11A  FIG.11B

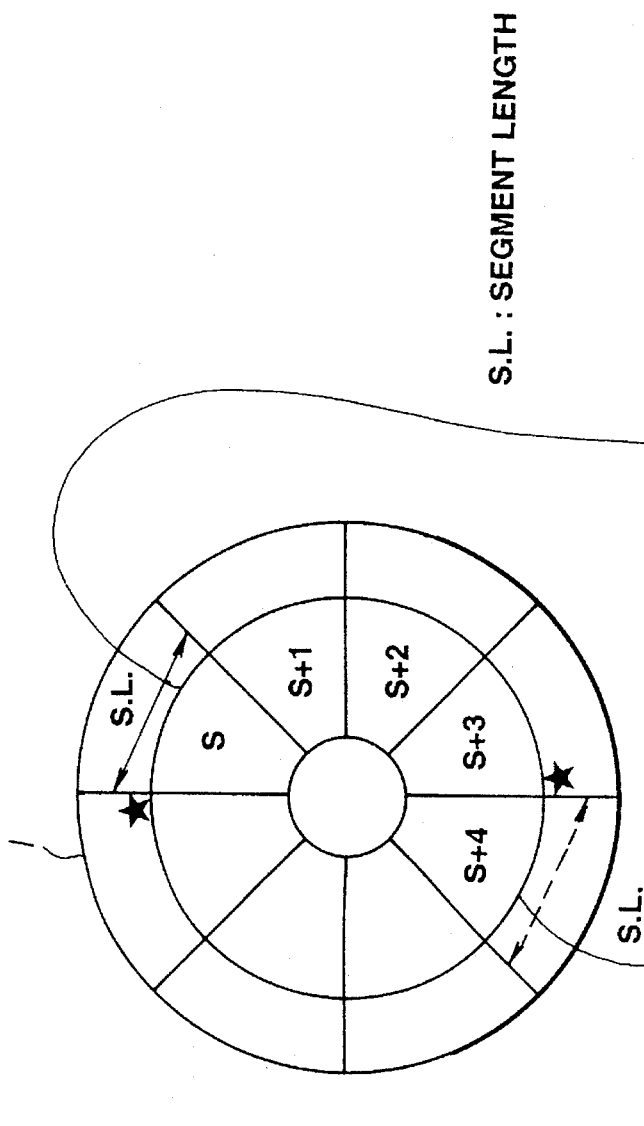
FIG.18A
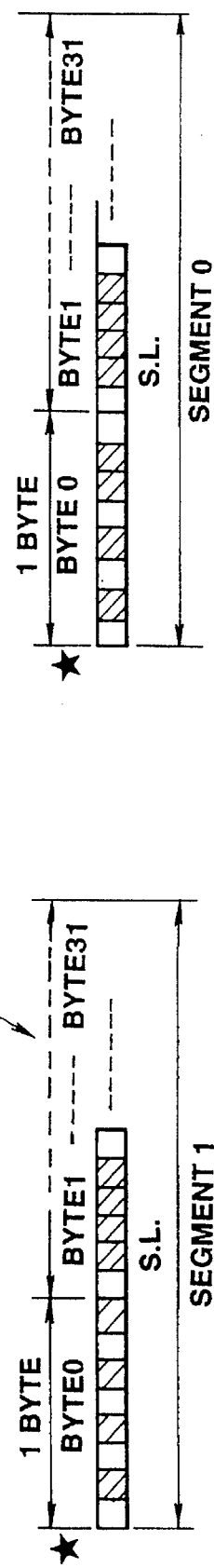
FIG.18C
FIG.18B

DISC-LIKE RECORDING MEDIUM AND APPARATUS FOR PRODUCING IT

BACKGROUND OF THE INVENTION

1. Field of the Invention

This invention relates to a disc-like recording medium represented by a magneto-optical disc and a magnetic disc, and particularly to a disc-like recording medium in which pre-formatted data such as clock information, servo information and read-only information are formed in advance and an apparatus for producing the disc-like recording medium by which the pre-formatted data are formed in the recording medium in advance.

2. Description of the Related Art

A technique of generating a system clock, from a clock mark buried in a disc, which is necessary for operating a disc driving apparatus has been practically employed for sample servo format in the magneto-optical disc.

An arrangement of a magneto-optical disc of the conventional sample servo format and an arrangement of a magnetic disc of the conventional sample servo are shown in FIGS. 1 and 2, respectively. Both of these discs are provided with a data area 101 in which information signals are recorded and a servo area 102 in which servo information is recorded in advance. In the servo area 102, so-called pre-formatted data are formed such as servo marks 103, clock marks 104, and access codes and read-only information (ROM information) 105.

For recording the pre-formatted data in the magneto-optical disc, a disc substrate 110 is provided with pits corresponding to the pre-formatted data when it is molded, and a reflecting film or a vertical magnetization film (recording film) 111 is formed thereon, as shown in FIG. 3. Thus, viewed from the side of the disc substrate 110, substantially circular lands are formed, that is, the servo marks and the clock marks.

As for recording of the pre-formatted data in the magnetic disc, there are two methods. By one method, the disc substrate is provided with pits corresponding to the pre-formatted data when it is molded, similarly to the above and as shown in FIG. 4A. After a magnetic film 112 is formed on the disc substrate 110, pits and lands in the servo area are magnetized in different directions. Thus, the magnetized information is formed as the servo marks and the clock marks.

By the other method, the magnetic film 112 is formed on the entire flat surface of the disc substrate 110, as shown in FIG. 4B, After a portion of the magnetic film 112 corresponding to the pre-formatted data is partly removed using a known lithography technique, the magnetic film in the servo area is magnetized. Thus, the residual portions of the magnetic film or the removed portions are formed as the servo marks and the clock marks.

Particularly in the above magnetic disc, the clock marks are formed continuously in the radial manner and direction of the disc so that the clock marks may be satisfactorily reproduced even though the head gap of the magnetic head has off-tracked.

System clock signals (recording/reproducing clock) may be produced by multiplying a clock pulse which is produced for each passage of the optical pickup on the clock mark 104 on the magneto-optical disc or of the magnetic head on the clock mark 104 of the magnetic disc.

Conventionally, the clock marks 104 are formed to be arrayed radially and linearly from the center of the disc. By this sample servo format, the recording/reproducing clock which is synchronized with the phase of the clock pulse produced from the clock mark 104 is generated using a phase locked loop (PLL). The PLL includes a phase comparator 121, a low-pass filter (LPF) 122, a voltage control oscillator (VCO) 123 and a frequency divider 124 for dividing the frequency by n, as shown in FIG. 5. The clock pulse Sc is entered to the phase comparator 121, thus initiating the oscillation of the VCO 123 at a frequency which is n times higher than that of the clock pulse Sc. Therefore, the recording/reproducing clock Ss having the frequency which is n times higher than that of the clock pulse Sc can be produced.

This recording/reproducing clock Ss is operative to grasp a θ-coordinate on the disc and to carry out recording and reproduction of all data. Accordingly, normal recording and reproduction may be carried out as long as the recording/reproducing clock Ss synchronized with the clock pulse Sc is produced. However, once the synchronization of the recording/reproducing clock Ss with the clock pulse Sc is released, normal recording and reproduction cannot be carried out at a predetermined timing.

Thus, conventionally, a linear head actuator (positioner) is used which linearly shifts the recording/reproducing head in the radial direction of the disc in order to access a desired track. By using this linear head actuator, the radial array of the clock marks 104 is in conformity with the direction of shift of the head actuator. Therefore, even in accessing the desired track at a high rate, the clock pulse Sc can be produced at equal time intervals, thus avoiding the disturbance to the PLL. That is, the phase of the recording/reproducing clock Ss will not be released from the phase of the clock pulse Sc.

The above mechanism is described with reference to FIGS. 6A and 6B. FIG. 6A shows the moment at which the clock mark indicated by point A is reproduced in the inner track, while FIG. 6B shows the reproduction of the next clock mark indicated by point B at the time when the outer track is accessed.

As seen from FIGS. 6A and 6B, the time since the reproducing head reproduces an arbitrary clock mark until it reproduces the next clock mark is equal to the time for the disc to rotate only an angle θ1 which is formed by two adjacent clock marks. Consequently, as long as the disc is rotated at a constant speed, no phase difference is generated between the recording/reproducing clock Ss and the clock pulse Sc even at the time of the access. Therefore, it is possible to reproduce or record data during the access.

However, the linear head actuator as conventionally used has disadvantages such that when the data in the disc are intended to be accessed at, a high speed, a large quantity of current is needed while the tracking is likely to be disturbed by externally applied acceleration.

It is appreciated from the above that the use of rotating type head actuator which is provided with the head on the distal end of a rotating arm thereof is advantageous for being unaffected by the increase in the access speed and the externally applied acceleration.

However, as the locus m of the head of the rotating head actuator draws an arc, as shown in FIG. 7, the head has a circumferential velocity component Vt at the time of the access. Therefore, a problem is generated that the locus m of the head is not along the radial direction of the disc when accessing data in the conventional disc, that is, the disc in which the pre-formatted data such as clock marks are formed radially and linearly.

For this reason, even though the disc is rotated at a constant velocity, the time interval of the clock pulse Sc produced from the disc changes in accordance with the access speed of the head. The PLL for generating the recording/reproducing clock Ss is operative to reduce the phase difference between the clock pulse Sc and the recording/reproducing clock Sc. However, a phase deviation transiently remains with a finite gain and band.

FIG. 8 shows temporal changes of the phase difference between the clock pulse Sc and the recording/reproducing clock Ss at the time when the rotating head actuator has accessed data on the disc having the clock marks 104 arrayed radially and linearly therein. In this example, a negative phase deviation is generated when the actuator is accelerated, while a positive phase deviation is generated when the actuator is decelerated. These phase deviations will not be zero for a while even after the end of the access. Such phase differences between the clock pulse Sc produced from the disc and the recording clock Sc prevent the recording and reproduction of data. Thus, it is impossible to read the track address during the high-speed access and to start the recording/reproduction of data at the same time as the end of access.

That is, as seen from FIGS. 9A and 9B, on the assumption that the head which is mounted to the rotating head actuator meets one clock mark at point C and then meets the next clock mark at point D during its outward access, the angle of rotation θ2 of the disc in this access is smaller than the rotation angle θ1 shown FIG. 6. Accordingly, the time taken from the reproduction of the clock mark until the reproduction of the next clock mark is reduced.

On the contrary, in case the data is accessed from the outer circle toward the inner circle of the disc, not shown, the time since the reproducing head reproduces an arbitrary clock mark until it reproduces the next clock mark is increased. In addition, the time interval changes in accordance with the access speed. The changes in the time interval for reproducing the clock marks cause the phase deviation of the PLL.

This problem remains also in case the magnetic disc is used in which the pre-formatted data, such as clock marks 104, servo marks 103 and ROM information 105, are radially and linearly formed in advance, as shown in FIG. 10. Particularly when this magnetic disc is used, the following problem as well as the above problem is generated. That is, when the magnetic disc is used in which the pre-formatted data, such as the clock marks 104, the servo marks 103 and the ROM information 105, are radially and linearly formed, as shown in FIG. 10, an azimuth angle β is generated between the edge of the pre-format and the head gap g by an angle of rotation of the rotating head actuator, thus excessively lowering the reproducing output.

SUMMARY OF THE INVENTION

In view of the above-described problem, it is an object of the present invention to provide a disc-like recording medium from which an accurate clock pulse may be produced even when accessed by the rotating head actuator at a high speed, and in which recording/reproduction of data by the rotating head actuator and recording/reproduction of data shortly after the end of access can be carried out.

Also, according to the present invention, when the disc-like recording medium is applied to the magnetic disc, an azimuth loss generated in accordance with the angle of rotation of the rotating head actuator may be eliminated.

In addition, according to the present invention, there is also provided an apparatus for easily producing the disc-like recording medium from which an accurate clock pulse may be produced even when accessed by the rotating head actuator at a high speed, and in which recording/reproduction of data by the rotating head actuator and recording/reproduction of data shortly after the end of access can be carried out.

Further, according to the present invention, there is also provided an apparatus for easily producing the disc-like recording medium by which the azimuth loss generated in accordance with the angle of rotation of the rotating actuator may be reduced when it is applied to the magnetic disc.

In the disc-like recording medium according to the present invention, pre-format data are formed along the rotation locus of the rotating head actuator for reading information on the recording medium. Therefore, in case the rotating head actuator is used, the time since the reproducing head reproduces an arbitrary clock mark until it reproduces the next clock mark is equal to the time for the disc to rotate only the angle θ1 which is formed by two adjacent clock marks. Accordingly, as long as the disc is rotated at a constant rate, no phase difference is generated between the recording/reproducing clock and the clock pulse even at the time of the access. Thus, it is possible to reproduce or record information during the access.

If the present invention is applied to a magnetic disc so as to format the clock marks, ROM information and servo marks thereof along the rotation locus, there are advantages such as elimination of the azimuth loss and production of a clock pulse, a ROM reproducing signal and a servo signal which are of satisfactory S/N ratio, as well as the above-mentioned advantage.

In the production apparatus according to the present invention, since a data array is outputted with delay in accordance with the radius of the disc-like recording medium, the radial array of the base points of the pre-formatted data, such as the clock marks, draws an arc to the radial direction of the recording medium. In addition, since the delay quantity for the data array in a delay unit is so set that the data array is along the locus of shift of the rotating head actuator, it is possible to form the array of the base points along the locus of shift of the rotating head actuator, and to use the rotating head actuator which is strongly resistant to external disturbances as a positioning driving system for the recording/reproducing head. Thus, it is possible to carry out satisfactory recording and reproduction of information signals in the disc.

BRIEF DESCRIPTION OF THE DRAWINGS

FIG. 4A shows a disc substrate on which pits are formed, while FIG. 4B shows a disc substrate wit, hour, pit formed thereon, but with a magnetic film patterned thereon.

FIG. 8 is a graph showing a PLL phase deviation at the time when data in the conventional disc are accessed by the rotating head actuator.

FIG. 10 is a view for illustrating inconvenience, that is, generation of an azimuth angle, of a conventional magnetic disc.

FIG. 11A shows a recording format pattern in case a disc of an embodiment is applied to a magneto-optical disc. FIG. 11B shows a recording format pattern in case the disc of the embodiment is applied to a magnetic disc.

FIG. 18 is a view for illustrating exemplary pattern data of format data formed in a circular substrate or a disc in the pattern generator.

DETAILED DESCRIPTION OF THE INVENTION

An embodiment in which a disc-like recording medium according to the present invention is applied to a magneto-optical disc and a magnetic disc of the sample servo format (hereinafter referred to simply as a disc) will now be described with reference to FIGS. 11 to 22.

Particularly, in the present embodiment, a feed device of a recording/reproducing head loaded in a disc recording/reproducing apparatus is a rotating head actuator 64 provided with a recording/reproducing head 63, for example via a gimbal spring, on a distal end of an arm 62 thereof with a supporting shaft 61 as its center of rotation. In this case, the locus of radial shift of the head 63 draws an arc with the supporting shaft 61 as the center and with the distance from the center to the head 63 as the radius of curvature. The radial array of base points of the disc, such as clock marks Mc and servo marks Ms, is formed along the locus of shift.

Figure 1:
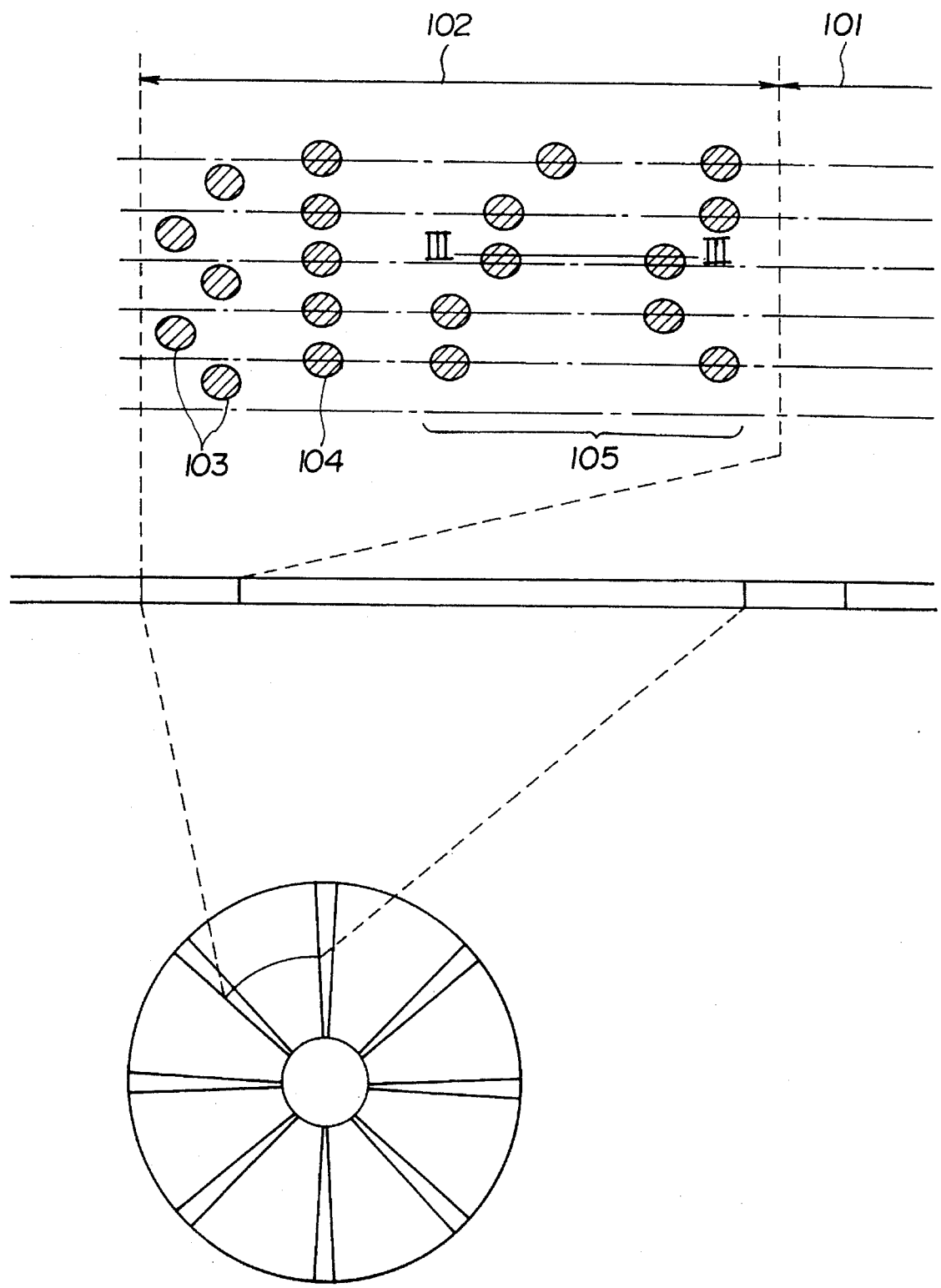
FIG. 1 is a view for illustrating an exemplary recording format in a magneto-optical disc of the sample servo format.
Figure 2:
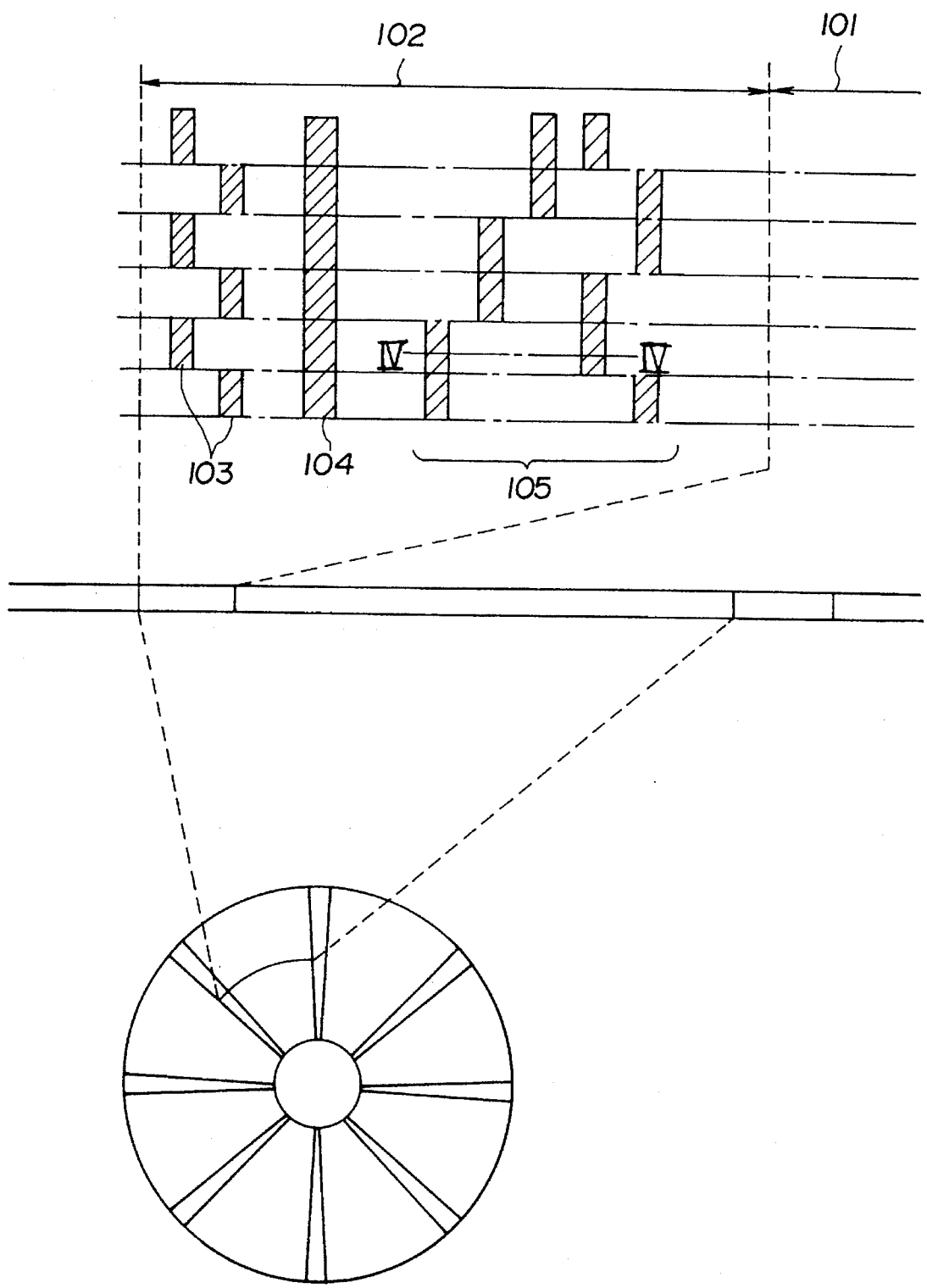
FIG. 2 is a view for illustrating an exemplary recording format in a magnetic disc of the sample servo formal.
Figure 3:
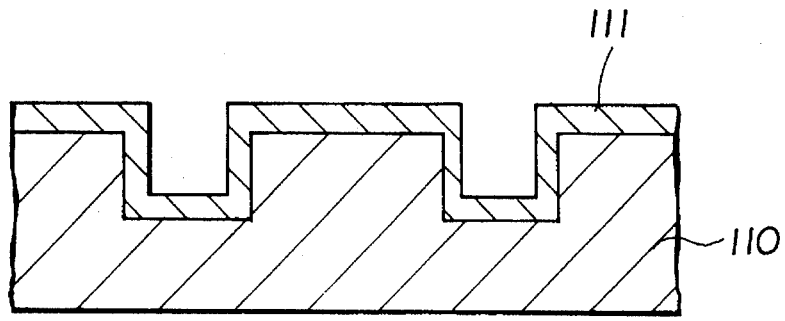
FIG. 3 is a cross-sectional view on a line A—A in FIG. 1.
Figure 4A:
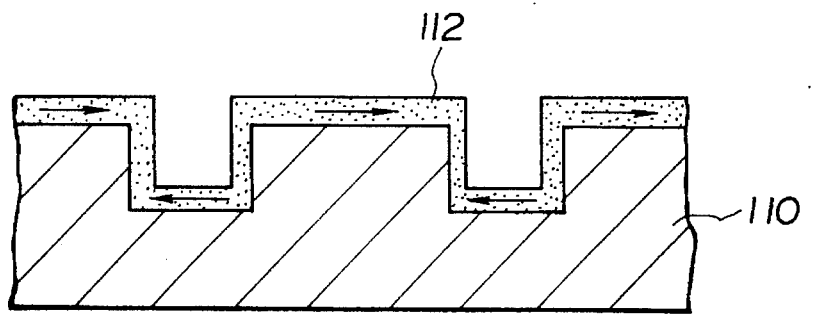
FIGS. 4A and 4B are cross-sectional views on a line B—B in FIG. 2.
Figure 4B:
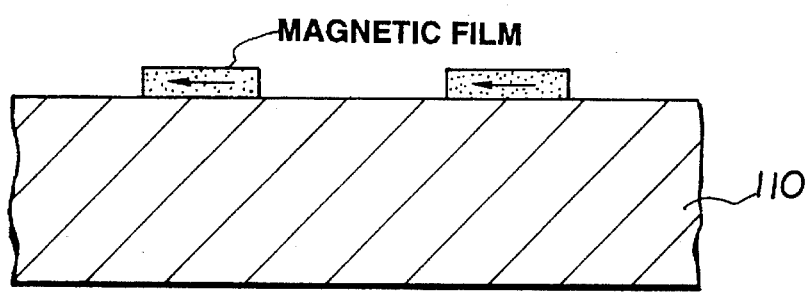
Figure 5:
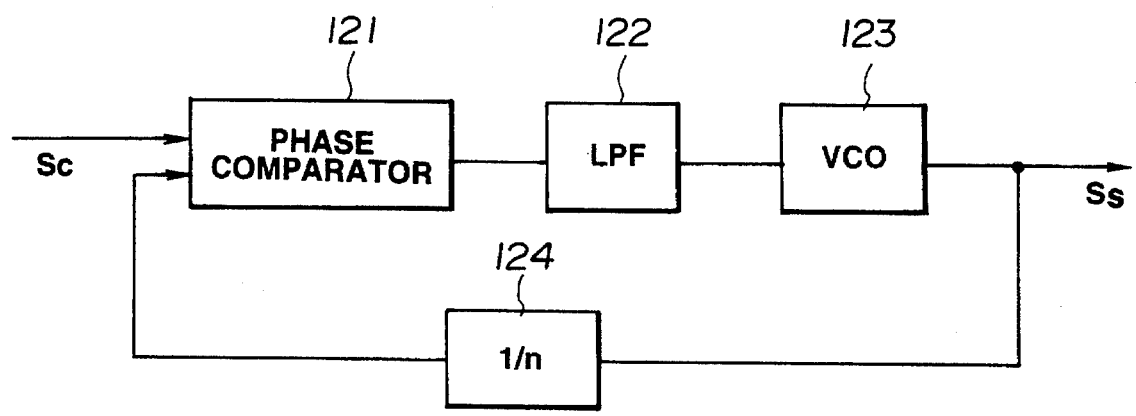
FIG. 5 is a block circuit diagram showing an typical arrangement of the PLL as a multiplying unit.
Figure 7:
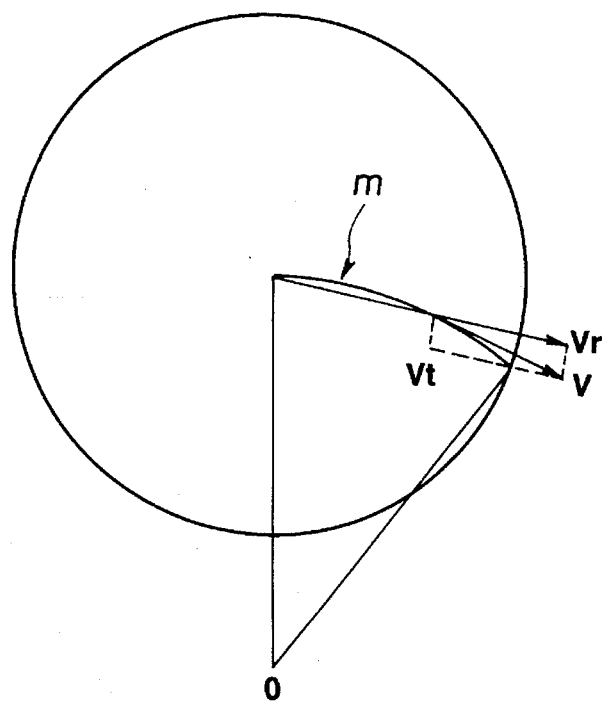
FIG. 7 is a view for illustrating a velocity vector of a recording/reproducing head of a rotating head actuator.
Figure 6A:
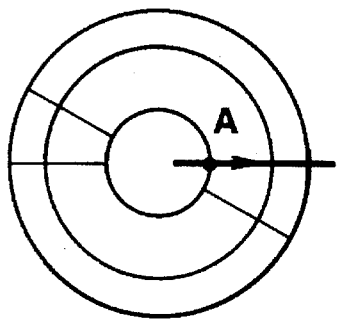
FIGS. 6A and 6B is a view for illustrating a state in which data in a conventional disc are accessed by a linear head actuator.
Figure 6B:
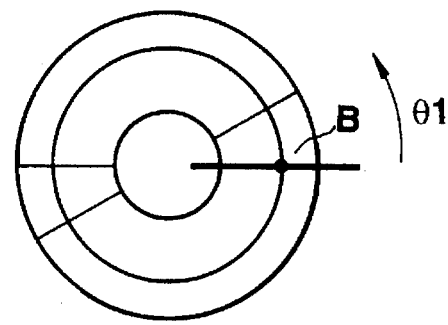
Figure 9A:
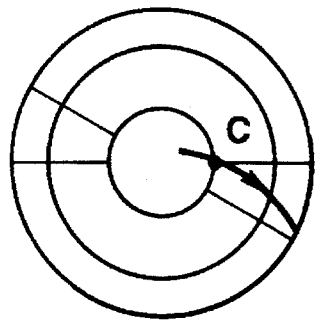
FIGS. 9A and 9B is a view for illustrating a state in which data in the conventional disc are accessed by the rotating head actuator.
Figure 9B:
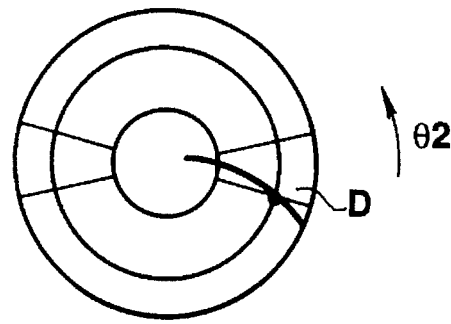
Figure 11C:
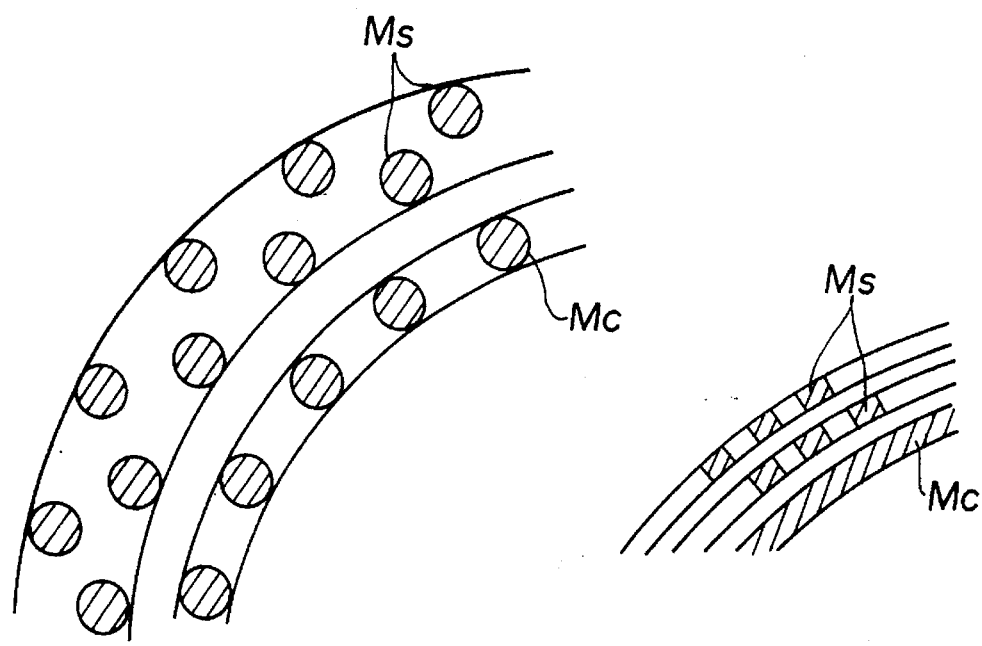
FIG. 11C is a plan view showing the embodiment in which the disc-like recording medium of the present invention is applied to the magneto-optical disc and the magnetic disc of the sample servo format, and a rotating head actuator.
Figure 11C:
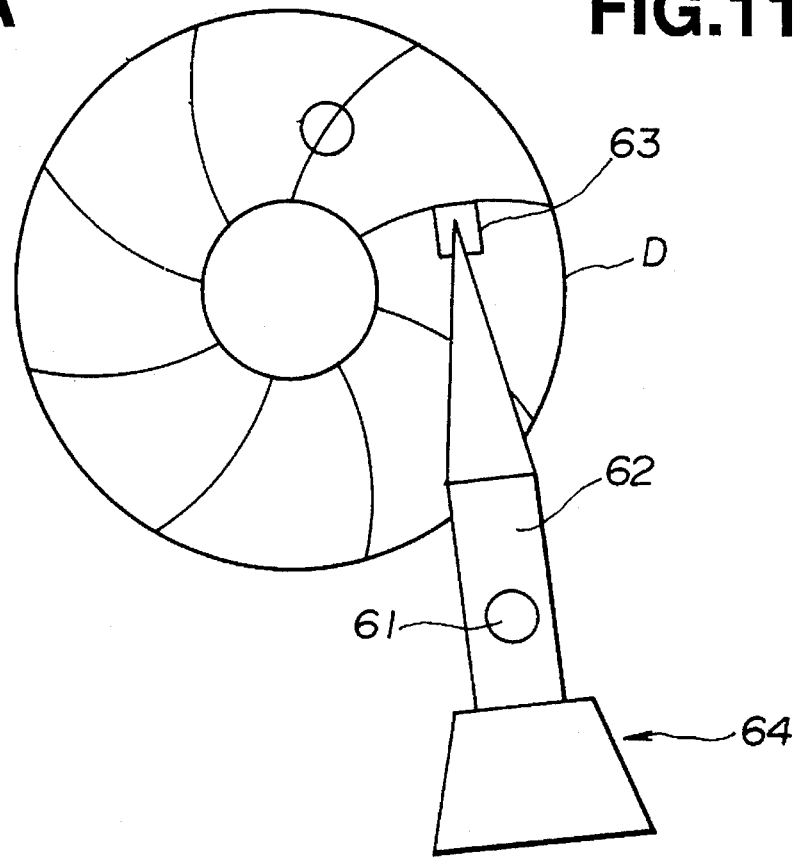
Figure 12A:
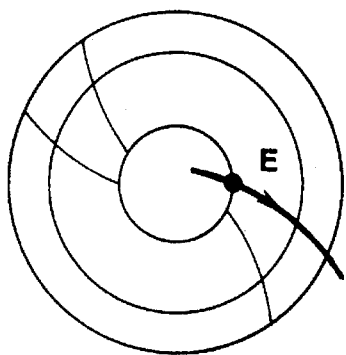
FIGS. 12A and 12B is a view for illustrating a state in which data in a disc are accessed by the rotating head actuator.
Figure 12B:
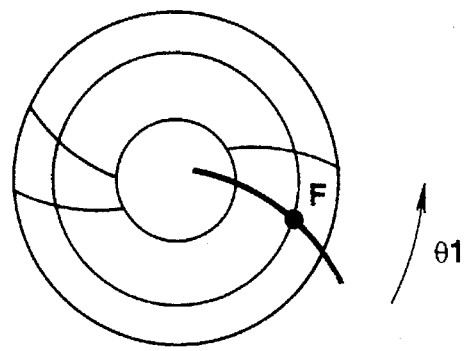

In this manner, in the disc of the present embodiment, a pre-formatted pattern, and particularly the clock marks Mc or the servo marks Ms as the base points thereof, are formed along the locus of rotation of the rotating head actuator 64 for reading information in a disc D. In case the rotating head actuator 64 is used the time since the recording/reproducing head reproduces an arbitrary clock mark, as indicated by point E in FIG. 12A, until the head reproduces the next clock mark, as indicated by point F in FIG. 12B, is equal to the time for the disc D to rotate an angle θ1 which is formed by the two adjacent, clock marks, as indicated by points E and F, respectively.

In case a clock pulse produced from the clock mark on the disc D is multiplied to produce a recording/reproducing clock, an accurate recording/reproducing clock even during high-speed access by the rotating head actuator. As long as the disc D is rotated at a constant speed, no phase difference is generated between the recording/reproducing clock and the clock pulse even at the time of access. Therefore, it, is possible to reproduce or record information during the access.

Accordingly, it is possible to record/reproduce data even during the access by the rotating head actuator. In addition, since the recording/reproducing clock is not disturbed even shortly after the end of high-speed access, it is possible to carry out recording/reproduction shortly after the access.

Figure 13A:
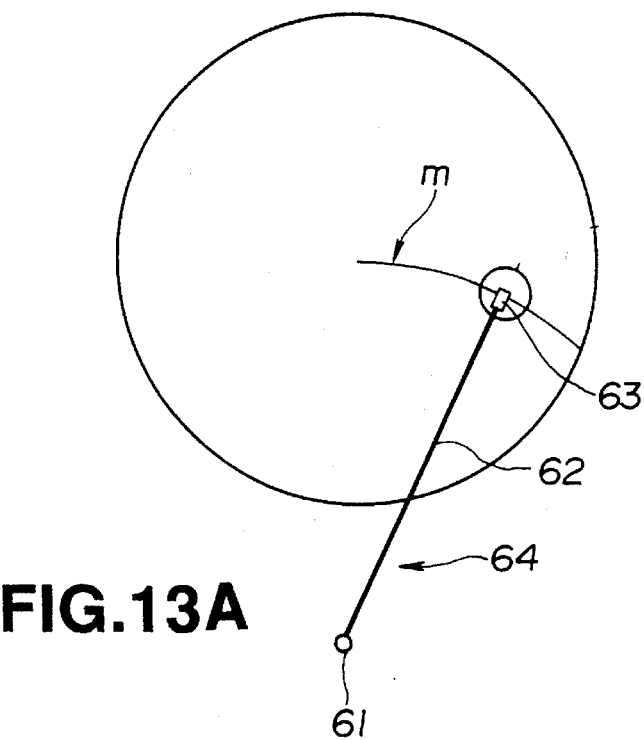
FIG. 13 is a view for illustrating an advantage, that is, a reduction in loss due to the azimuth angle, in case the disc of the present invention is applied to a magnetic disc.
Figure 13B:
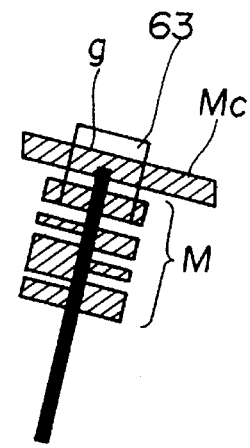

Particularly, in the magnetic disc according to the present invention, since the clock marks Mc, ROM information and the servo marks Ms are formed along the locus of rotation m of the rotating head actuator, as shown in FIG. 13, the loss due to the azimuth angle formed with a head gap is eliminated, and therefore the clock pulse, ROM reproducing signals and servo signals of satisfactory S/N ratio may be produced.

Then, a laser cutting device according to the present embodiment which is employed for producing the disc D is described with reference to FIG. 14.

Figure 14:
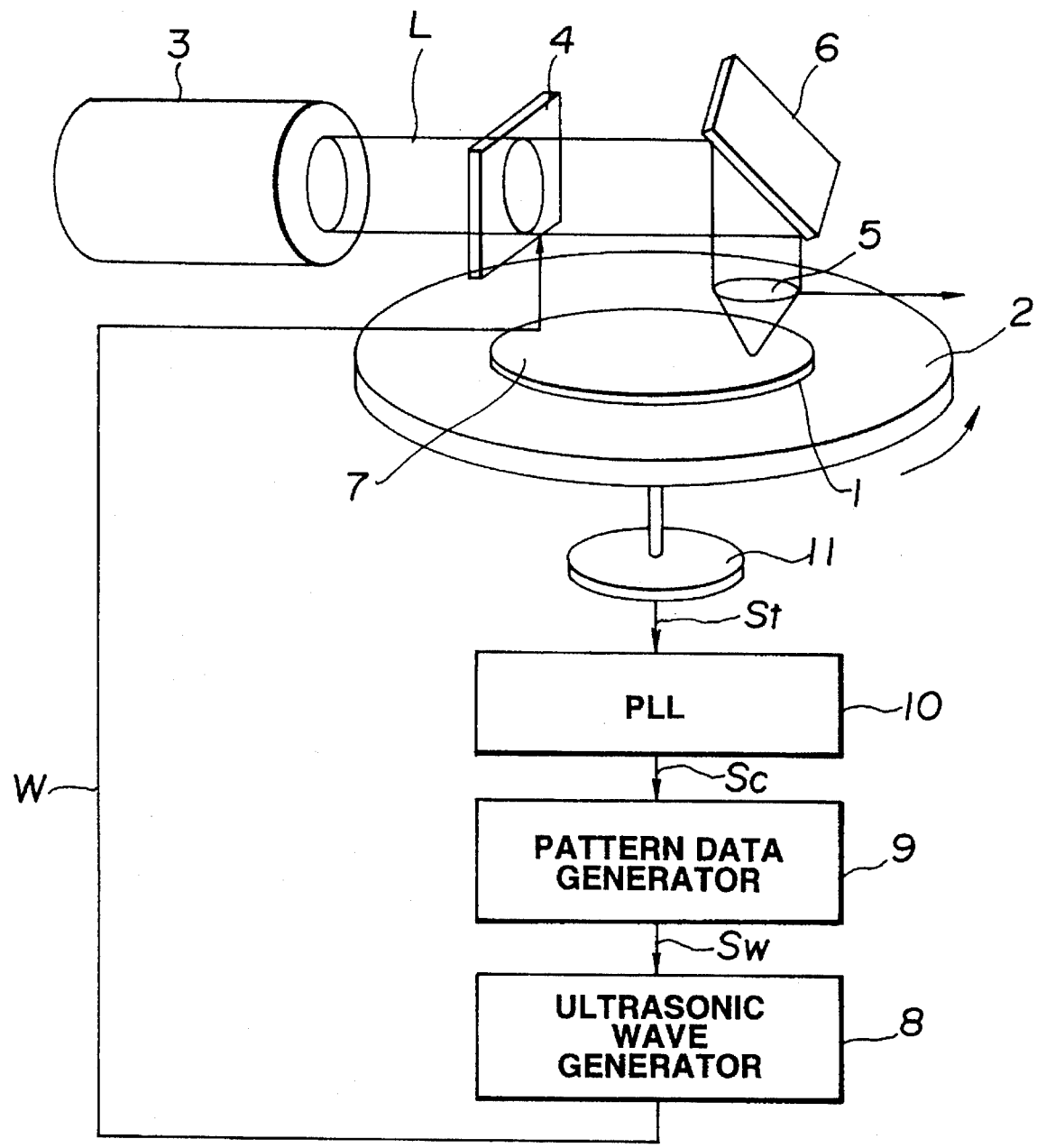
FIG. 14 is a view showing an arrangement of a laser cutting device employed in producing the disc of the present invention.

This laser cutting device fundamentally includes a turn table 2 on which a smooth circular substrate 1 of glass is set, a gas laser light source 3 for using a gas as an amplification medium, an acousto-optic modulator (AOM) 4 for carrying out intensity modulation on a laser beam L radiated from the gas laser light source 3 on the basis of an ultrasonic wave W modulated at a recording pattern signal Sw, and a mirror 6 for leading to an objective lens 5 the laser beam L on which intensity modulation has been carried out by the AOM 4, as shown in FIG. 14.

The circular substrate 1 is fixed on the turn table 2 by, for example, vacuum adsorption. The turn table 2 is driven by a spindle motor, not shown, so as to be rotated in a constant angular velocity (CAV) mode. A photoresist film 7 is applied on an entire surface of the circular substrate 1. The objective lens 5 is provided above the photoresist film 7, facing it at a predetermined distance therefrom. The objective lens 5 is to be shifted along with the mirror 6 in a radial direction of the circular substrate 1 by a known sliding mechanism mainly of a stepping motor.

If the photosensitive material of the photoresist film 7 is positive, an Ar laser having an oscillation wavelength of 458 nm or a He-Cd laser having an oscillation wavelength of 442 nm is selected as the above-mentioned laser beam L. Also, a Kr laser having an oscillation wavelength around 400 nm may be used recently. These gas lasers 3 are radiated by a Brewster window as the laser beam L of linear polarization.

An ultrasonic wave generator 8 is connected to the AOM 4. The ultrasonic wave generator 8 is operative to modulate an ultrasonic wave which has been generated thereby, on the basis of the recording pattern signal Sw supplied to an input terminal thereof, the recording pattern signal Sw being a signal which has been electrically converted from a recording pattern scratched on the photoresist film 7. The ultrasonic wave W modulated by the ultrasonic wave generator 8 is supplied to the AOM 4.

The AOM 4 is comprised of, for example, $TeO_2$ crystal. The AOM 4 uses phase diffraction grating due to a change in the refractive index which has been generated in the crystal by an ultrasonic wave supply from the ultrasonic wave generator 8, and thus uses a primary diffracted light of the Bragg diffraction thereof for recording signals. The intensity of the diffracted light depends on the ultrasonic wave power, while the direction of diffraction depends on the carrier frequency.

The recording pattern signal Sw is produced by a pattern data generator 9 as later described. The generator 9 produces the recording pattern signal Sw on the basis of the clock pulse Sc generated by a PLL 10. The PLL 10 generates the clock pulse Sc by multiplying a rotation timing pulse St by A, the rotation timing pulse St being supplied from a rotary encoder 11 mounted to the spindle motor.

A method of producing a disc base plate according to the present embodiment by the laser cutting device will now be described.

First, the smooth circular substrate of glass or the like is abraded, and the photoresist film 7 is applied thereon. After that, the circular substrate 1 is fixed on the turn table 2, and is rotated by the spindle motor in, for example, the CAV mode. In this rotation of the substrate, the objective lens 5 and the mirror 6 are shifted in a radial direction of the circular substrate 1, and a laser spot Ls produced by converging the laser beam on the photoresist film 7 is shifted in one radial direction of the circular substrate 1.

On the photoresist film 7, a resist latent image corresponding to the pre-formatted data pattern is formed by turning on/off the laser beam L by the AON 4 synchronously with the rotation of the turn table 2. After that, a portion of the photoresist film 7 corresponding to the pre-formatted data on the circular substrate 1 is removed by developing the photoresist film 7. A metallic film is vapor-deposited on the entire surface including the residual portion of the photoresist film 7, to produce a metallic base plate. Then, a mother and a stamper are duplicated from the metallic base plate, so as to mold from the stamper a disc substrate of synthetic resin. The portion corresponding to the pre-formatted data pattern is formed as a pit.

A recording surface is formed on the surface of the disc substrate having pits formed thereon, to complete a magneto-optical disc. On the other hand, after a magnetic film is formed on the surface of the disc substrate having the pits formed thereon, the pits and lands are magnetized in different magnetization directions, to complete a magnetic disc.

An embodiment of the pattern data generator 9 connected to the laser cutting device will now be described with reference to FIGS. 15 to 22.

Figure 15:
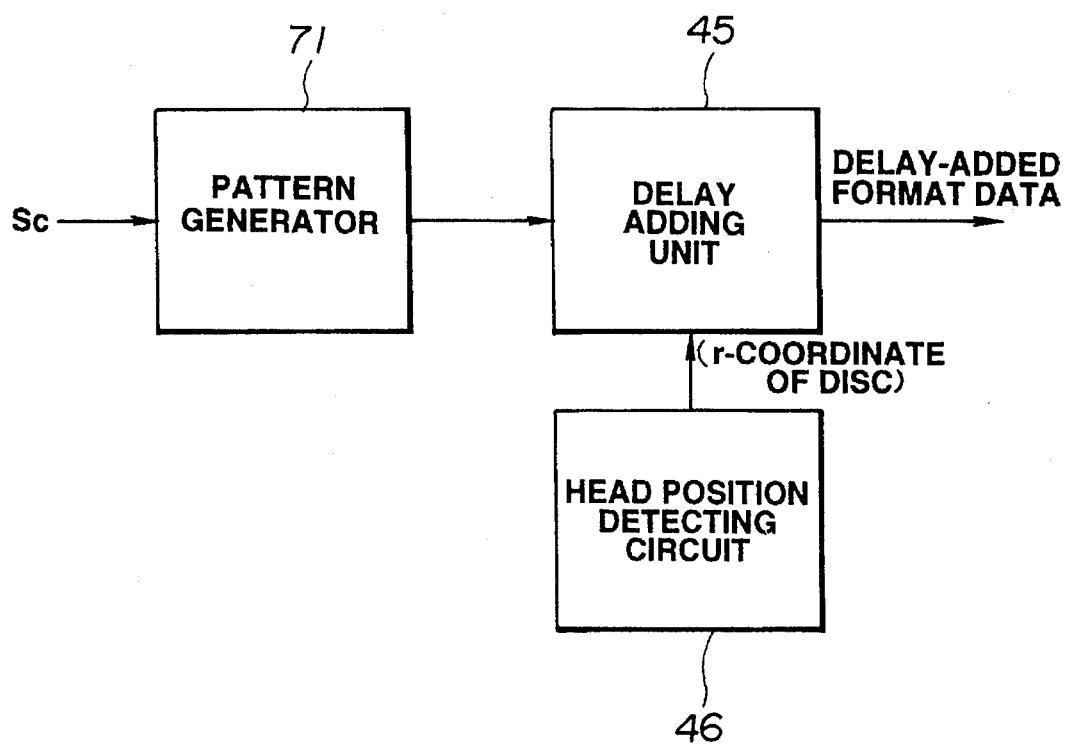
FIG. 15 is a schematic block diagram showing an arrangement of a pattern data generator according to the present invention.

An arrangement of the pattern data generator 9 of the present embodiment is shown in FIG. 15. The pattern data generator 9 is constituted by a pattern generator 71 for producing format pattern data on the basis of the clock pulse Sc generated by the PLL 10, and a delay adding unit 45 for adding, to the pattern data supplied from the pattern generator 71, a predetermined delay quantity in accordance with the radius of the circular substrate 1. Thus, the pattern data generator 9 can form a data pattern in the arcuate shape to the radial direction of the circular substrate 1.

Figure 16:
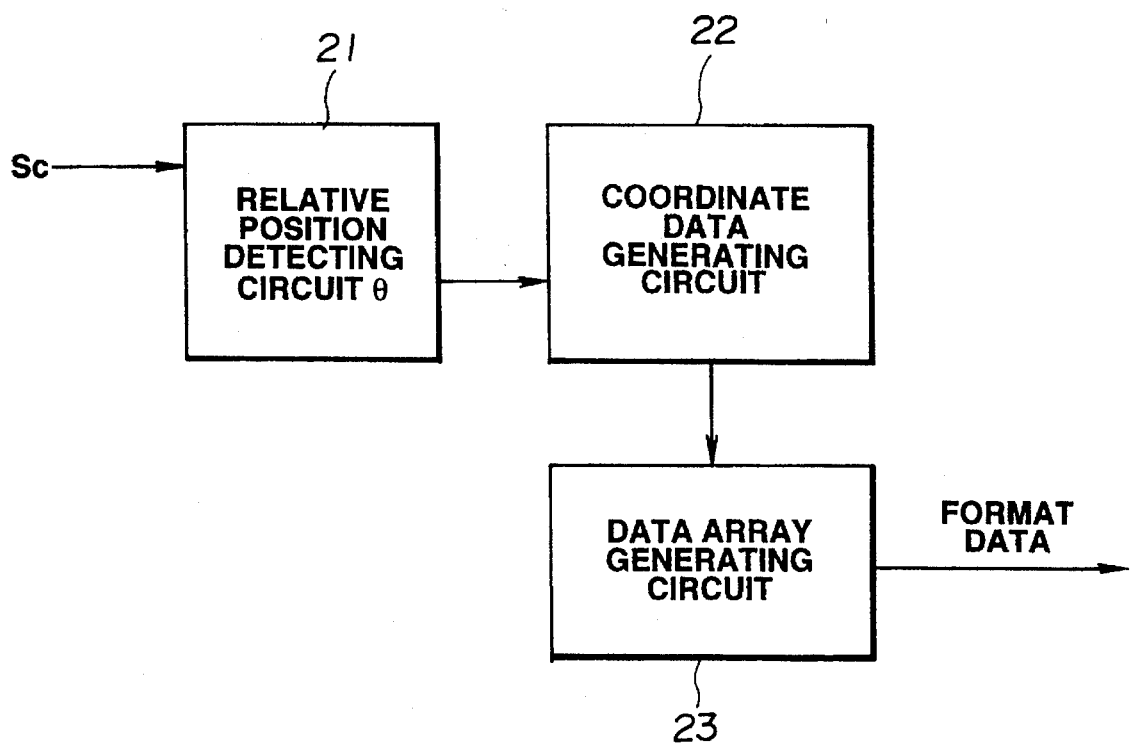
FIG. 16 is a schematic block diagram showing a pattern generator constituting the pattern data generator of the present invention.

As shown in FIG. 16, the pattern generator 71 includes a relative position detecting circuit 21 for detecting a relative position (angle of rotation θ) to a cutting head of the laser cutting device on the basis of the clock pulse Ss supplied from the PLL 10, a coordinate data generating circuit 22 for outputting coordinate data on the basis of detected data from the relative position detecting circuit 21, and a data array generating circuit 23 for outputting, in series, a data array based on the coordinate data supplied from the coordinate data generating circuit 22. The PLL 10 in this embodiment multiplies the rotation timing pulse St from the rotary encoder 11 by A, and generates the clock pulse Sc having the same pulse cycle as the bit interval in data recording/reproduction.

A concrete arrangement of an exemplary pattern generator 71 is described with reference to FIG. 17. First, a concept of a segment in this embodiment is described. In FIG. 18, if the circular substrate 1 is divided circumferentially into Ns units of portions at an equal-angular pitch, each of the divided portions is called a segment.

Figure 17:
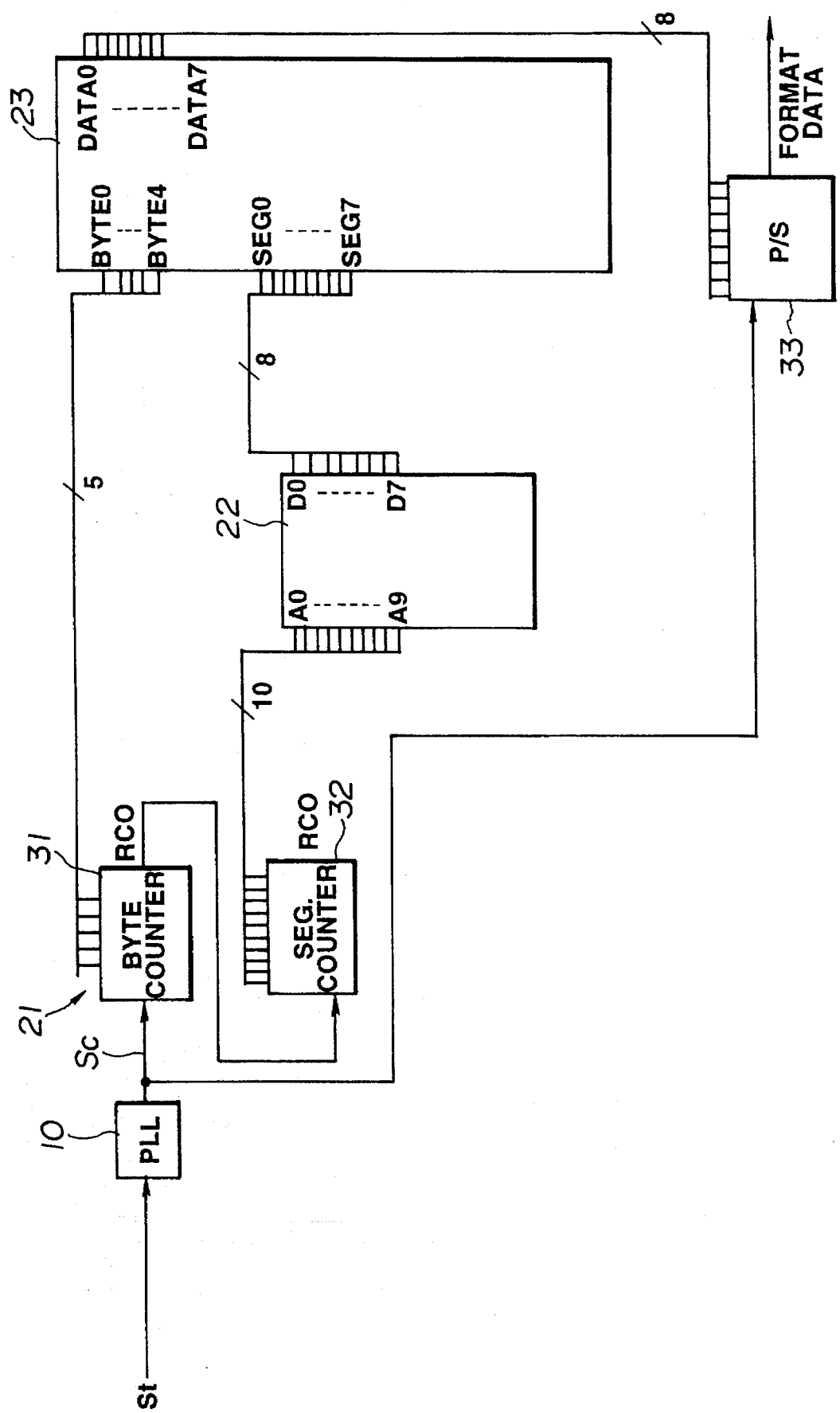
FIG. 17 is a block diagram showing a concrete arrangement of an exemplary pattern generator.

As shown in FIG. 17, the relative position detecting circuit 21 is constituted by a byte counter 31 and a segment counter 32. The byte counter 31 is a counter which is operative to count the clock pulse Sc outputted from the PLL 10 to count one for 8 clocks and to output 5 bits. The byte counter 31 is operative to count the number of output clock pulses Sc, and when the count value is equal to the number of bytes per segment of the recording format in the disc, a carry-over pulse is outputted from an output terminal RCO for carrying over, so as to reset the count value to 0.

The segment counter 32 is a counter for counting the carry-over pulse from the byte counter 31 and outputting 10 bits, and is operative to count the number of segments. When the count value is equal to the number of segments per circle of the disc, the carry-over pulse is outputted from the output terminal RCO for carrying over, so as to reset the count value to 0.

The coordinate data generating circuit 22 is comprised of a RAM, having coordinate data of 8 bits contained in sequence of address in an array variable region thereof, as shown in Table 1. The circuit 22 is operative to read out coordinate data from the array variable region, with the count value from the segment counter 32 supplied to an input terminal of 10-bit array as a read-out address S, and then to output the coordinate data read out from an output terminal of 8-bit array.

TABLE 1

| SEGMENT ADDRESS S | | |
|---|---|---|
| NO. | COUNT VALUE | COORDINATE DATA |
| 0 | 0000000000 | 00000000 |
| 1 | 0000000001 | 00000000 |
| 2 | 0000000010 | 00000010 |
| 3 | 0000000011 | 00000010 |
| 4 | 0000000100 | 00000001 |

TABLE 1-continued

| SEGMENT ADDRESS S | | |
|---|---|---|
| NO. | COUNT VALUE | COORDINATE DATA |
| 5 | 0000000101 | 00000001 |

The data array generating circuit 23 is comprised of a RAM, having data array files allocated for each of the segments registered in an array variable region thereof, as shown in Table 2. Each of the data array files has 32 units of 8-bit data (arrays) contained therein. In Table 2, the data arrays are shown in the concept of address instead of files. In the data arrays of Table 2, the site to be irradiated with the laser beam L is denoted by "1" and the other portions are denoted by "0."

TABLE 2

| ADDRESS | | | | | |
|---|---|---|---|---|---|
| SEGMENT | | BYTE | | | |
| NO. | COUNT VALUE | NO. | COUNT VALUE | DATA | |
| 0 | 00000000 | 0 | 00000 | 01010110 | DATA |
|   |          | 1 | 00001 | 011110... | ARRAY |
|   |          | ~ | ~     | ~         | 0 |
|   |          | 31 | 11111 |          |   |
| 1 | 00000001 | 0 | 00000 | 01010101 | DATA |
|   |          | 1 | 00001 | 011110... | ARRAY |
|   |          | ~ | ~     | ~         | 1 |
|   |          | 31 | 11111 |          |   |
| 2 | 00000010 | 0 | 00000 | 01011000 | DATA |
|   |          | 1 | 00001 | 011110... | ARRAY |
|   |          | ~ | ~     | ~         | 2 |
|   |          | 31 | 11111 |          |   |
| ~ | ~        | ~ | ~     | ~         | ~ |
| 251 | 11111111 | 0 | 00000 | 01010111 | DATA |
|   |          | 1 | 00001 | 011110... | ARRAY |
|   |          | ~ | ~     | ~         | 251 |
|   |          | 31 | 11111 |          |   |

Then, the data array generating circuit 23 is operative to select a corresponding data array file on the basis of the coordinate data which are supplied from the coordinate data generating circuit 22 and which are supplied to an input terminal of 8-bit array. Further, the circuit 23 is operative to read out data from the selected data array file, with the count value as the read-out address which is supplied from the byte counter 31 and which is supplied to an input terminal of 5-bit array, and then to output the data read out from an output terminal of 8-bit array.

The read-out address for the selected data array file is updated each time the count value of the byte counter 31 is updated. From the output terminal, 32 units of data from data relating to the lead address of the selected data array file to data relating to the final address are outputted in sequence of address. The output data are supplied to a parallel/serial (P/S) converter 33 on the next stage.

The P/S converter 33 is a circuit for converting the data supplied to the input of 8-bit array into binary data in series at an output timing of the clock pulse Sc outputted from the PLL 10. The binary data in series outputted from the P/S converter 33 are supplied as the pre-formatted data of the disc to the ultrasonic wave generator 8 in the laser cutting device.

The number of data array files registered in the RAM constituting the data array generating circuit 23 is 256 at most, since the coordinate data is of 8 bits. That is, the maximum of 256 kinds of 32 units of 8-bit data can be contained.

Then, the laser scratching pattern (disc pattern) onto the circular substrate 1 as shown in FIG. 17 and the operation of the pattern generator 71 will be described with reference to Tables 1 and 2. The byte length of each segment depends on the number of output bits of the byte counter 31, which is 32 bytes in this embodiment.

First, if the count value outputted from the segment counter 32 is "0000000000," that is, the segment address is 0, coordinate data "00000000" is selected in the coordinate data generating circuit 22, as shown in Table 1, and is supplied to the data array generating circuit 23 on the subsequent stage. In the data array generating circuit 23, the data array file is selected which corresponds to the content, that is, "00000000" in this case, of the coordinate data from the coordinate data generating circuit 22.

In other words, as shown in Table 2, the data array corresponding to segment number 1 is selected. Data are read out in sequence of address from the selected data array file (data array 0) each time the count value from the byte counter 31 which is supplied to the 5-bit input terminal is updated. The data are then outputted to the P/S converter 33 on the subsequent stage. From the P/S converter, data of the data array are outputted in series. The data pattern indicating the data array is laser-scratched in a portion (of photoresist film 7) on the circular substrate 1 corresponding to the segment number S.

If the number of rotation timing pulses St from the rotary encoder 11 is B per circle of the circular substrate, the count value (segment number S in Table 1) outputted from the segment counter 32 is updated for each (8×32)/(A.B) rotations. From the data array generating circuit 23, data arrays corresponding to segment numbers 0, 0, 2, 2, 1, 1 ... are sequentially outputted. Thus, the data pattern corresponding to the angle of rotation θ of the circular substrate 1 is laser-scratched on the photoresist film 7 of the circular substrate 1.

Accordingly, the data pattern (a pattern denoted by data array 0) denoted by segment number 0 of which the count value is "00000000" in Table 2 is formed in the S-th segment on the circular substrate 1. Similarly, the data pattern denoted by segment number 0 is formed in the (S+1)th segment, while the data pattern (a pattern denoted by data array 2) denoted by segment number 2 of which the count value is "00000010" is formed in the (S+2)th segment.

The data pattern denoted by segment number 2 is formed in the (S+3)th segment, while the data pattern (a pattern denoted by data array 1) denoted by segment number 1 of which the count value is "00000001" is formed in the (S+4)th segment. The disc patterns formed in the S-th and (S+4)th segments, respectively, are shown in FIG. 18, in which the portions indicated by slant lines are those irradiated with the laser beam by, for example, the laser cutting device.

The delay adding unit 45 shown in FIG. 15 is operative to add, to the format data from the generator, a delay quantity based on the detected signal from a head position detecting circuit 46 for detecting the relative position in the radial direction of the cutting head.

A concrete arrangement of an exemplary pattern data generator 9 will now be described with reference to FIG. 19.

The pattern data generator 9 is constituted by connecting therein a delay circuit 45 which is constituted by connecting multi-stage delay lines C1, C2, C3, C4, ..., Cn in series on the subsequent stage of the pattern generator 71. The pattern data generator 9 is so wired that the output from the pattern generator and the outputs from the delay lines C1, C2, C3, C4, ..., Cn are supplied to a multi-input single-output selector 47. In the selector 47, an input terminal selected in accordance with an output from a controlling circuit 48 having a delay quantity setting memory is connected to the output terminal, and the output supplied to the selected input terminal is outputted as the format data.

The controlling circuit 48 is connected, on the preceding stage thereof, with the head position detecting circuit 46. The head position detecting circuit 46 is constituted by, for example, a sliding encoder mounted to the sliding mechanism for shifting the cutting head in the radial direction of the circular substrate 1 or a rotary encoder mounted to a stepping motor as a driving source of this sliding mechanism.

The delay quantity setting memory contained within the controlling circuit 48 is comprised of, for example, a RAM, and has a delay quantity table registered in an array variable region thereof. In the delay quantity table, delay quantity data (data relating the input terminal to be selected, in this case) corresponding to position detecting data (radius data) from the head position detecting circuit 46 are registered. In this delay quantity setting memory, the corresponding delay quantity data can be taken out from the delay quantity table, with the position detecting data (radius data) from the head position detecting circuit 46 as the read-out address.

Then, the controlling circuit 48 is operative to output the delay quantity data to the selector 47. The select, or 47 is operative to select an input terminal corresponding to the supplied delay quantity data, and to output pattern data which is supplied to the selected input terminal, as the format data via an output terminal.

Figure 20A:
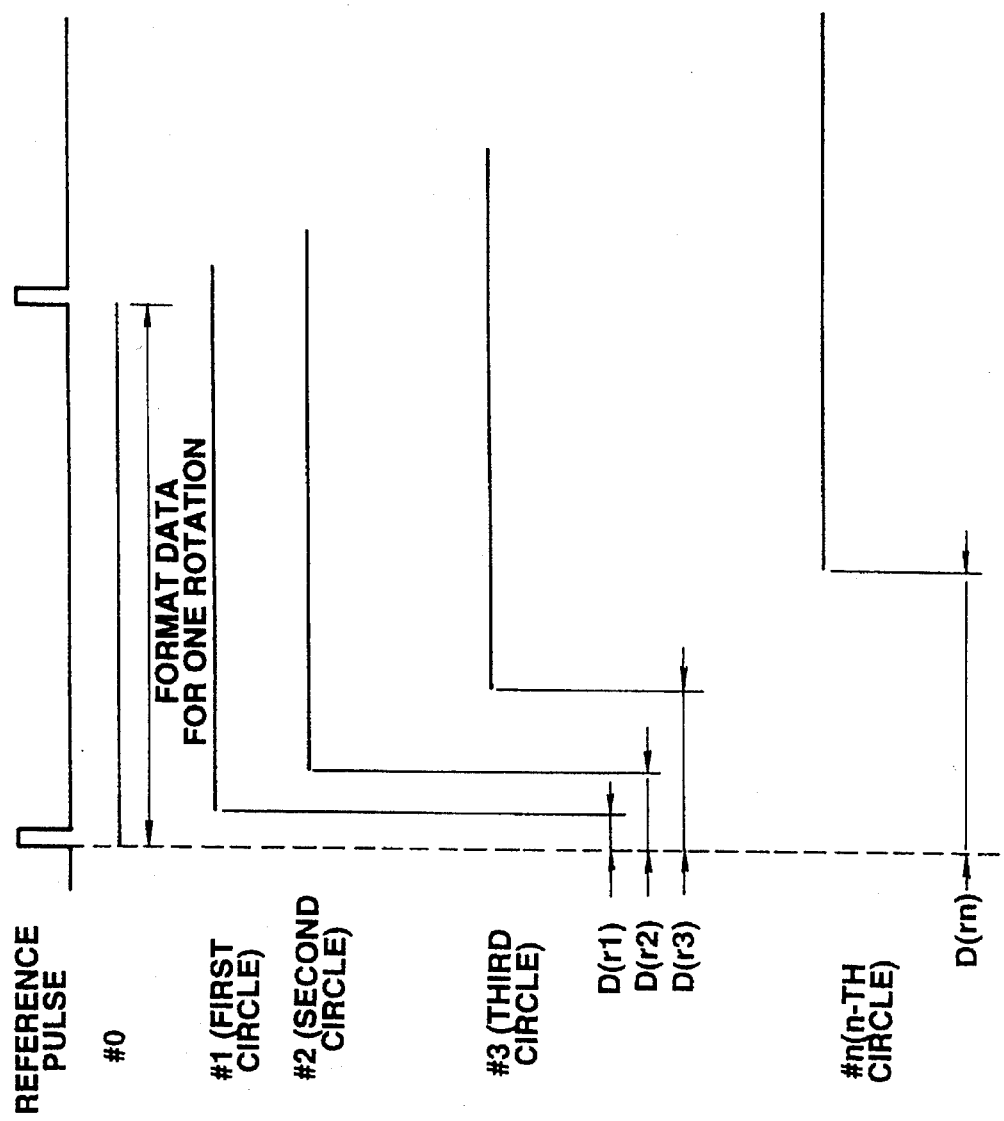
FIG. 20 is a view for illustrating a concept of a delay quantity added to format data in the pattern data generator of the present invention.
Figure 20B:
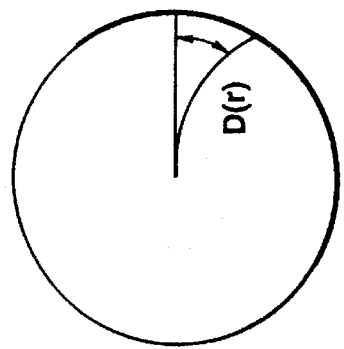

The delay circuit 45 is operative to change the number of stages of the delay line in accordance with the relative position in the radial direction of the cutting head. For example, when the laser scratching by the cutting head is started on the inner circle of the circular substrate 1, with a radial line passing on the starting point of the laser scratching in the innermost circle being the reference line, as shown in FIG. 20, the delay quantity data are so set as to increase the number of stages of the delay line gradually toward the outer circle. With the output timing of a home pulse (for example a rotation timing pulse from the rotary encoder 11) generated at the timing of passing on the reference line being assumed as the starting point, the output timing of the format data is gradually delayed toward the outer circle. In the example shown in FIG. 20, the format data in the innermost circle with the delay quantity of 0 is outputted at the same time as the home pulse. As the format data proceeds to the first, second, third, ..., n-th circles, the delay quantity is sequentially added in a manner that $D(r1) < D(r2) < D(r3) < D(rn)$.

Figure 21:
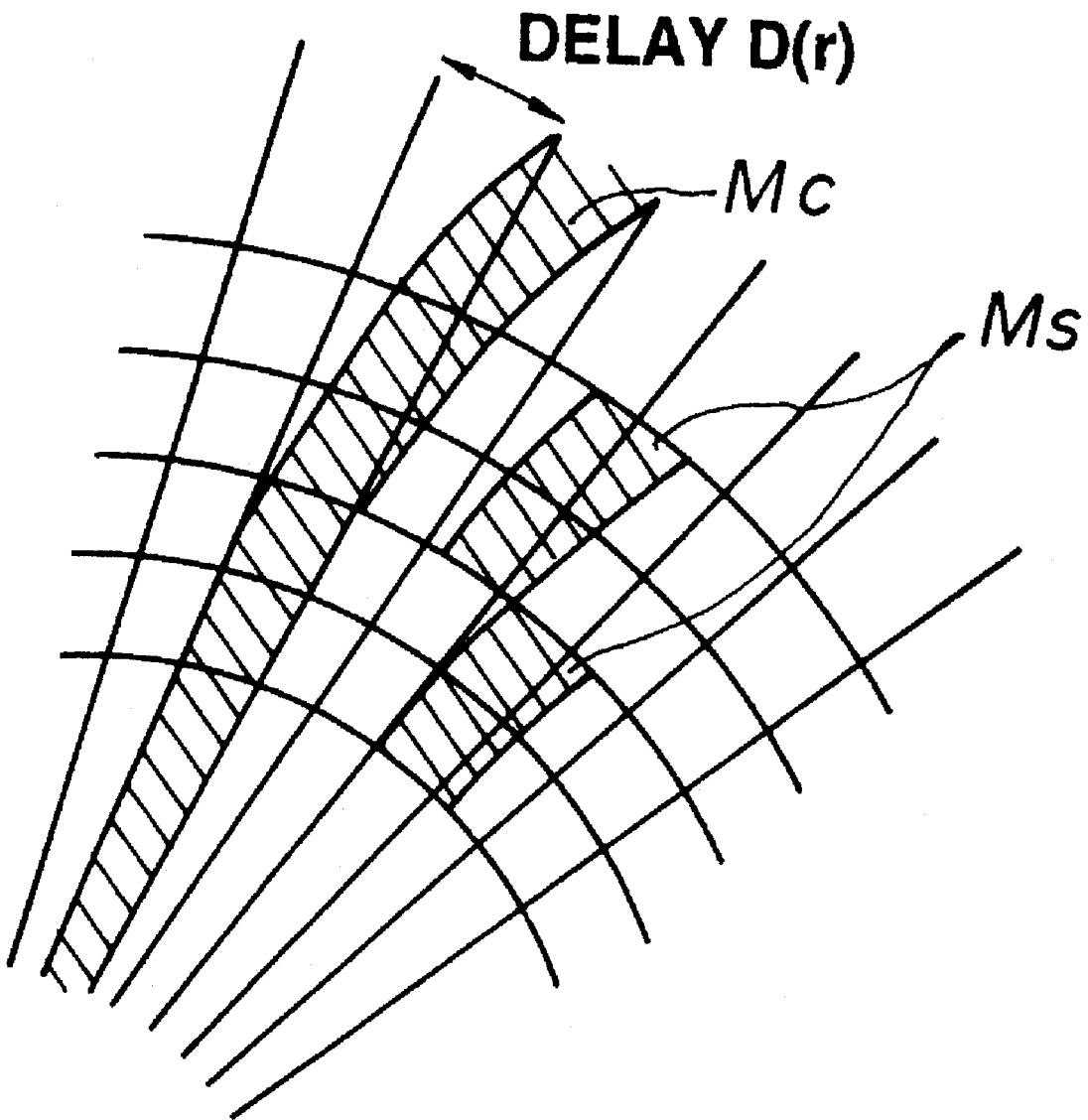
FIG. 21 is a concept view showing a forming pattern of format data formed in the pattern data generator of the present invention.

By so setting the delay quantity added to the format data as to gradually increase toward the outer circle in this manner, the line connecting the base points of format data of the respective circles (for example, clock marks Mc) draws an arc to the radial direction of the disc D, as shown in FIG. 21. Thus, a format pattern of high degree of freedom cab be realized. Particularly, if the delay quantity on one delay line is set to be sufficiently smaller than the clock cycle of the PLL 10, the format pattern can be formed in a shape that the line connecting base points (clock marks Mc) to draws a smooth arc.

Figure 22:
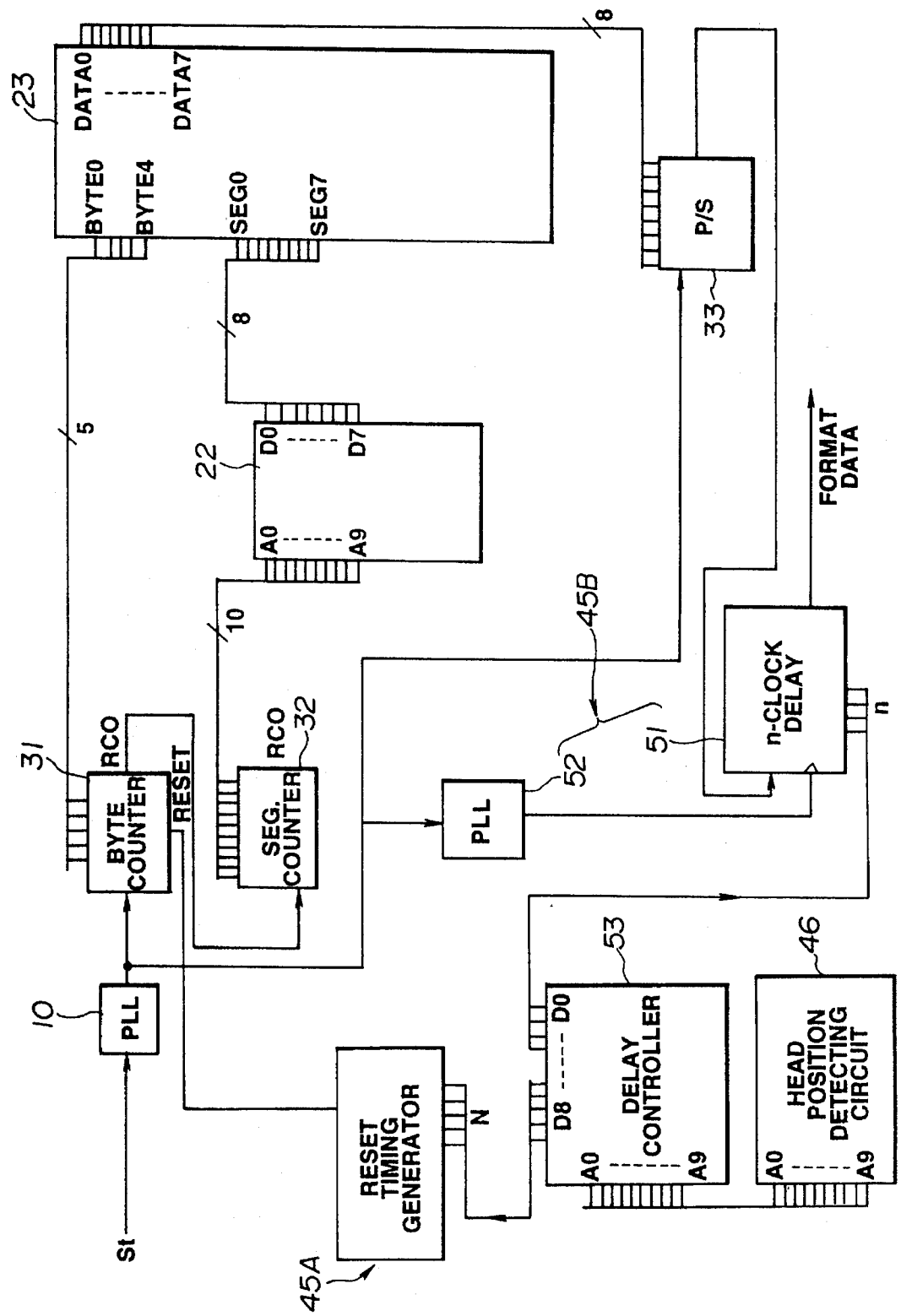
FIG. 22 is a block diagram showing a concrete arrangement of another exemplary pattern data generator of the present invention.

Another exemplary pattern data generator 9 will now be described with reference to FIG. 22. As shown in FIG. 22, this generator 9 is comprised of the pattern data generator 9 shown in FIG. 17 with a first delay circuit 45A for making variable the reset timing of the byte counter 31 and a second delay circuit 45B for delaying the pattern data from the P/S converter 33 being connected thereto.

The first delay circuit 45A is constituted by a reset timing generating circuit connected to a reset terminal of the byte counter 31. The second delay circuit 45B is constituted by an n-clock delay circuit 51 connected to the subsequent stage of the P/S converter 33 and a PLL 52 connected between the PLL 10 and the n-clock delay circuit 51. Delay data (integer data) from a delay controller 53, as later described, are entered to the reset timing generating circuit 45A and to the n-clock delay circuit 51, respectively.

The delay controller 53 includes an input terminal of 10-bit array and an output terminal of 9-bit array. The 10-bit data from the head position detecting circuit, 46 are supplied to the input terminal. Of the data outputted from the delay controller 53, upper 4-bit data are entered to the n-clock delay circuit 51, while lower 5-bit data are entered to the reset timing generating circuit 45A.

Figure 19:
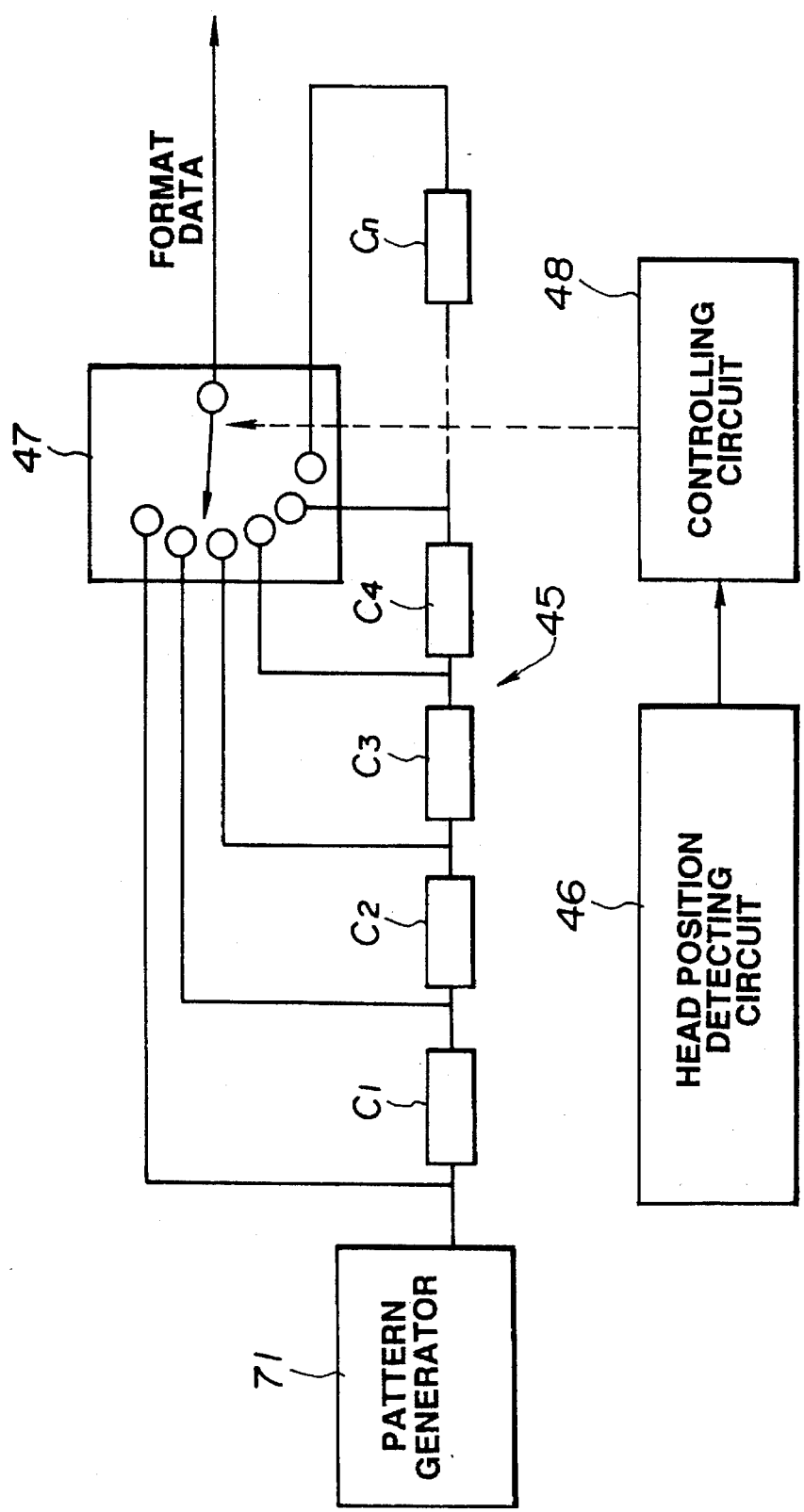
FIG. 19 is a block diagram showing a concrete arrangement of an exemplary pattern data generator of the present invention.

A data table which is the same as the delay quantity table registered to the delay quantity memory in the controlling circuit 48 shown in FIG. 19 is registered to the delay controller 53. The data table is comprised of 4-bit integer data and 5-bit integer data which correspond to the position detecting data from the head position detecting circuit 46 and are registered in sequence of address. Each integer data is read out from the data table, with the position detecting data from the head position detecting circuit 46 as the read-out address.

With the cycle of the clock pulse Sc outputted from the PLL 10, that is, the bit cycle, being denoted by M, and with the cycle of the clock pulse outputted from the PLL 52 being denoted by m, the relation between the cycles is M>m. In the present embodiment, the reset timing of the byte counter 31 is outputted with a delay of M×N from the normal timing by the reset timing generating circuit 45A. Further, the output of the P/S converter 33 is delayed for output by m×n. As a result, the total delay quantity D(r) is expressed by the following formula.

$$D(r) = M \times N + m \times n$$

In this manner, the delay quantity accessed in accordance with the position of the cutting head is added to the format data for output. The line connecting the base points (e.g. clock marks Mc) of the format data on the respective circles draws an arc to the radial direction of the disc D, as shown in FIG. 21. Thus, the format pattern of high degree of freedom can be realized.

In the pattern data generator 9 of the above embodiment, data arrays are delayed for output in accordance with radial data of the circular substrate 1 or the disc D. Therefore, the radial array of the base points (e.g. clock marks Mc) of the format data draws an arc to the radial direction of the circular substrate 1 or the disc D. Thus, it is possible to so set the delay quantity for the data array in the delay adding unit 45 as to be along the locus of rotation of the rotating head actuator 64. It is possible to form the array of the base points (e.g. clock marks Mc) along the locus of rotation of the rotating head actuator 64. Accordingly, it is possible to use the rotating head actuator which is strongly resistant to the external disturbance, as the driving system for positioning for the recording/reproducing head 63, and to carry out satisfactory recording/reproduction of the information signals in the disc D.

In the above-described embodiment, the coordinate data generating circuit 22 and the data array generating circuit 23 are comprised of RAMs. However, they may be comprised of ROMs such as EEPROMs. Also, though the delay setting memory in the controlling circuit 48 shown in FIG. 19 is comprised of a RAM, it may be comprised of a ROM such as an EEPROM.

As has been described above, in the disc-like recording medium according to the present invention, in which the pre-formatted data such as clock information, servo information and read-only information are formed in advance, the pre-formatted data are formed along the locus of rotation of the rotating head actuator for reading information in the disc-like recording medium. Therefore, even in case the data are accessed by the rotating head actuator at a high speed, it is possible to produce accurate clock pulses, and to carry out recording/reproduction of data by the rotating head actuator and recording/reproduction shortly after the access. Particularly in case the disc-like recording medium is applied to the magnetic disc, it is possible to eliminate the azimuth loss generated in accordance with the angle of rotation of the rotating head actuator.

In addition, the apparatus for producing the disc-like recording medium of the present invention is for forming the pre-formatted data such as clock information, servo information and read-only information in the disc-like recording medium in advance. The apparatus is provided with the delay unit for adding a predetermined delay quantity to the data array for output in accordance with the radius of the disc-like recording medium, and forms the pre-formatted data in the recording medium along the locus of rotation of the rotating head actuator for reading information in the recording medium. Therefore, even in case the data are accessed by the rotating head actuator at a high speed, it is possible to produce accurate clock pulses, and to easily produce the disc-like recording medium in which the recording/reproduction of data by the rotating head actuator and the recording/reproduction shortly after the access can be carried out. Also, in case the recording medium is applied to the magnetic disc, it is possible to easily produce the disc-like recording medium in which little azimuth loss is generated in accordance with the angle of rotation of the rotating head actuator.

What is claimed is:

1. A disc-like recording medium having pre-formatted magnetic data formed therein in advance, comprising: pre-formatted magnetic data formed into the disc-like recording medium as visible marks having different magnetic directions along a predetermined locus of rotation corresponding to a rotating head actuator for reading information therein.

2. An apparatus for producing a disc-like recording medium for forming magnetic pre-formatted data in the disc-like recording medium in advance, the apparatus comprising:

a formatting head means for moving radially across the disc-like recording medium and forming the pre-formatted data into the disc-like recording medium as visible marks having different magnetic directions; and delay means for adding a predetermined delay quantity to a data array for output in accordance with a radius of the disc-like recording medium, the pre-formatted data being formed in the disc-like recording medium along a predetermined locus of rotation corresponding to a rotating head actuator used for reading information in the disc-like recording medium after production of the disc-like medium recording.

3. The apparatus for producing a disc-like recording medium as claimed in claim 2, in which the delay means includes two-stage delay means including means for setting the delay quantity by a bit unit and means for setting the delay quantity by a unit smaller than 1 bit.

4. The apparatus according to claim 2, wherein said delay means comprises:

a head position detecting circuit means for outputting a signal corresponding to a radial position of the head means with respect to the disc-like recording medium;

a control circuit means for receiving said signal from said head position detecting circuit means and communicating delay quantity data dependent on said radial position of said head means;

a pattern generator means having multi-stage delay lines connected in series, for generating the pre-formatted data and outputting the data to the multi-stage delay lines;

a selector means for receiving said delay quantity data and selecting an input terminal corresponding to the delay quantity data, said input terminals connected to said multi-stage delay lines.

5. An apparatus for producing a disc-like recording medium for forming optical pre-formatted data in the disc-like recording medium in advance, the apparatus comprising:

delay means for adding a predetermined delay quantity to a data array for output in accordance with radius of the disc-like recording medium, the pre-formatted data being formed in the disc-like recording medium along a locus of rotation of a rotating head actuator for reading information in the disc-like recording medium; and wherein said apparatus comprises a formatting head means for moving radially across the disc-like recording medium and forming the pre-formatted data thereon; and said delay means comprises:

a head position detecting circuit means for outputting a signal corresponding to a radial position of said head means;

a clock pulse generating means for producing clock pulses based on rotation speed of the disc-like medium;

a byte counter means for counting clock pulses and when a count of said clock pulses is equal to a number of bytes per segment of a recording format in the disc-like medium, producing a carry over signal and resetting the count to zero;

a segment counter means for receiving said carry over signal from the byte counter and counting the carry over signals until a count value is equal to the number of segments per circle of the disc-like medium;

a coordinate data generating circuit means for storing format array data and for receiving said signal corresponding to the radial position of the head means for producing a data array as output;

a converter means for receiving said data array from said coordinate data generating circuit means and converting said data array to pre-formatted pattern data as output to said formatting head means;

a first delay circuit means for making variable the reset timing of the byte counter; and a second delay circuit means connected between said converter means and said formatting head means for delaying the pattern data from the converter means connected thereto, and outputting said pattern data to said formatting head means for pre-formatting the disc-like medium.

* * * * *